United States Patent
Pandey et al.

(10) Patent No.: US 11,450,325 B1
(45) Date of Patent: Sep. 20, 2022

(54) NATURAL LANGUAGE PROCESSING

(71) Applicant: Amazon Technologies, Inc., Seattle, WA (US)

(72) Inventors: Rajesh Kumar Pandey, Bothell, WA (US); Arun Kumar Thenappan, Seattle, WA (US); Isaac Joseph Madwed, Seattle, WA (US); Joe Pemberton, Seattle, WA (US); Steven Mack Saunders, Bellevue, WA (US); Siddharth Mohan Misra, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 249 days.

(21) Appl. No.: 16/712,006

(22) Filed: Dec. 12, 2019

(51) Int. Cl.
*G10L 17/22* (2013.01)
*G06F 40/30* (2020.01)

(52) U.S. Cl.
CPC .............. *G10L 17/22* (2013.01); *G06F 40/30* (2020.01)

(58) Field of Classification Search
CPC .................................. G10L 17/22; G06F 40/30
See application file for complete search history.

(56) References Cited

U.S. PATENT DOCUMENTS

| | | | |
|---|---|---|---|
| 10,027,662 B1* | 7/2018 | Mutagi | G10L 15/22 |
| 2004/0010697 A1* | 1/2004 | White | G06F 21/31 |
| | | | 713/186 |
| 2011/0066634 A1 | 3/2011 | Philips et al. | |
| 2016/0104480 A1 | 4/2016 | Sharifi | |
| 2016/0314791 A1 | 10/2016 | Wang et al. | |
| 2019/0141039 A1* | 5/2019 | Stoops | H04L 51/02 |
| 2019/0205386 A1 | 7/2019 | Kumar et al. | |
| 2020/0285813 A1 | 9/2020 | Singh et al. | |
| 2020/0357395 A1 | 11/2020 | Mirelmann | |
| 2020/0364512 A1 | 11/2020 | Lee et al. | |
| 2021/0019375 A1 | 1/2021 | Croutwater et al. | |
| 2021/0089869 A1 | 3/2021 | Baughman et al. | |

\* cited by examiner

*Primary Examiner* — Kevin Ky
(74) *Attorney, Agent, or Firm* — K&L Gates LLP

(57) ABSTRACT

Devices and techniques are generally described for using user feedback to determine routing decisions in a speech processing system. In various examples, first data representing a first utterance may be received. Second data representing a first semantic interpretation of the first utterance may be determined. A first intent data processing application may be selected for processing the second data. Feedback data may be determined related to the first intent data processing application processing the second data. Third data representing a semantic interpretation of a second utterance may be received, wherein the first semantic interpretation is the same as the second semantic interpretation. A second intent data processing application may be determined for processing the third data based at least in part on the feedback data.

20 Claims, 7 Drawing Sheets

NATURAL LANGUAGE PROCESSING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. An intent data processing application (often referred to as a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
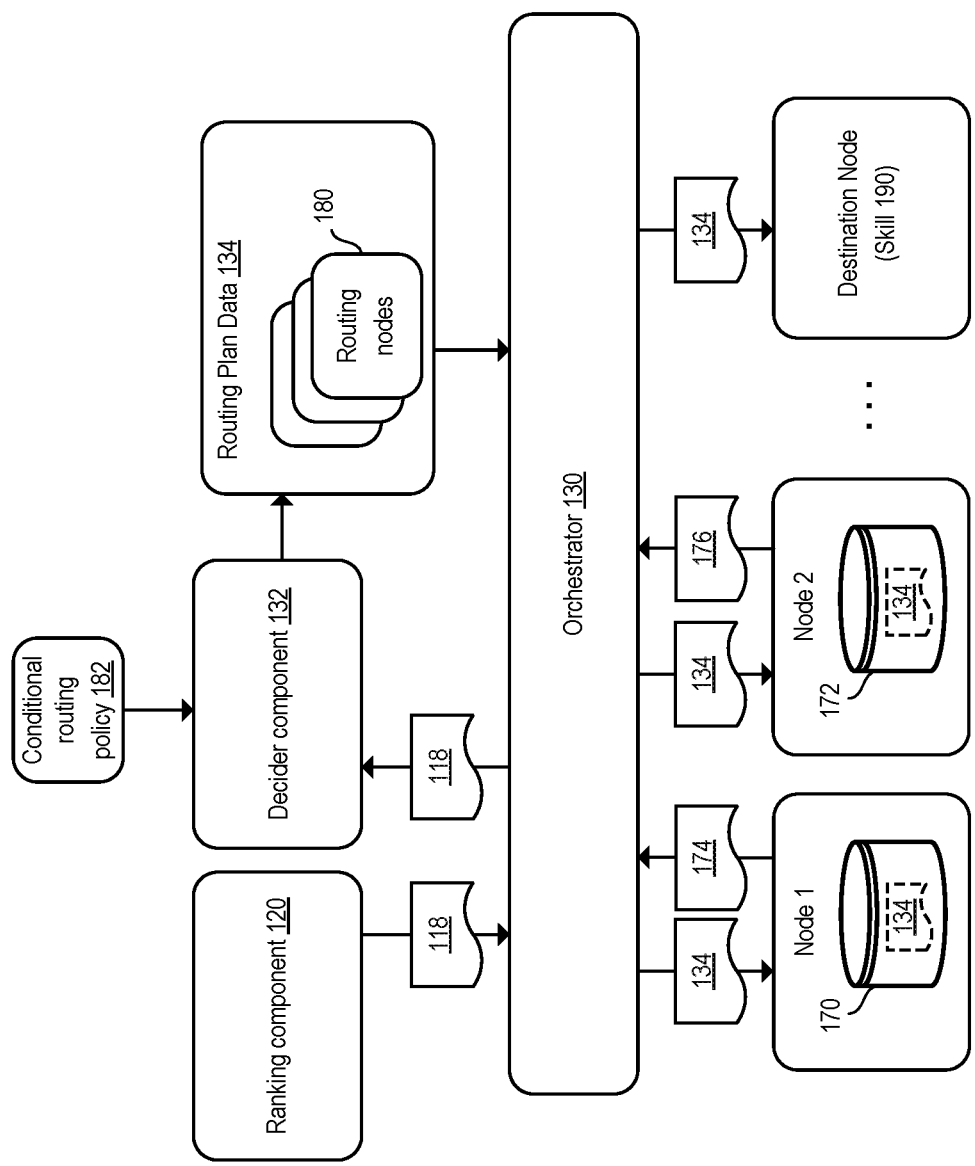
FIG. 1 is a block diagram illustrating an example conditional routing of speech processing request data, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance. As used herein, user utterances, input text data, and/or any form of requests input to a speech processing system may be described by "request data" and/or "user request data." Such request data may change forms many times during processing of the request data by various components of the speech processing system, as described in further detail below. For example, initially the request data may be audio data and/or input text data representing a user question. The audio data may be transformed into text data by an ASR component of the speech processing system. The text data may be transformed into intent data by an NLU component of the speech processing system. The intent data may be used by a speech processing skill and/or intent data processing application to perform an action. "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software. Similarly, "skills," as used herein, may refer to any types of intent data processing applications.

In various examples, speech processing systems may determine an action to take for processing particular request data according to an interpretation of the utterance determined by NLU. For example, a particular intent data processing application—sometimes referred to as a "skill" when the application is executed by a system located physically remote from the user's device or otherwise interfaces with a speech processing system—may be selected to process request data based on a determination that the utterance pertains to the particular intent data processing application. For example, an intent data processing application may be selected to process request data based on one or more intents and/or named entities determined during NLU processing of the request data. In another example, a speech processing system may determine an application that may generate a response to a user utterance that may be output via a TTS component of the speech processing system. Selection of the appropriate action and/or the appropriate speech processing component used to take the action and/or process the request data is non-trivial. In various examples described herein, user feedback may be used to select an intent data processing application that may be used to process particular request data. In various examples, the user feedback may be explicit feedback that is requested from the user after processing the request data using an intent data processing application. In some other examples, the user feedback may be implicit feedback that is determined based on user behavior during and/or after request data processing by an intent data processing application (e.g., whether the user interrupts playback and/or requests that an action taken be stopped).

In various examples, execution of a requested action may be conditioned on one or more intermediate actions. For example, some intent data processing applications may require user authentication before allowing a user to use a service provided by the intent data processing application. For example, an intent data processing application may generate data (e.g., audio data for output via TTS) representing a request for user authentication information. In an example, a user may speak a request for a taxi from a particular taxi service to a speech processing-enabled device. However, the intent data processing application (e.g., a skill) associated with the taxi service may require user authentication prior to dispatching a taxi. Accordingly, the speech processing system may send the user request data to an authentication application whereupon the user may perform an authentication procedure (e.g., entering and/or saying a password, etc.) in order to be authenticated as an authenticated user. In some examples, after authentication, the speech processing routing procedure may prompt the user for the requested action. For example, a TTS component of the speech processing system may prompt the user by outputting the audio: "Thank you for logging in. How can I help you?"

In various techniques described herein, routing data (e.g., routing plan data) may be determined that accounts for conditional routing scenarios such as that described above in which one or more intervening actions are executed prior to the user-requested action. In the various techniques described herein, the routing plan data may include data representing the conditional routing nodes (such as the authentication service described above) in addition to data representing the user-requested action (such as the ordering of a taxi from the taxi service in the example above). The routing plan data may be passed between the speech processing system and the conditional nodes and ultimately to the user-requested destination node (e.g., an intent data processing application of the taxi service). Advantageously, routing plan data that includes data representing the conditional nodes as well as the destination node may, in effect, maintain a memory of the user-requested action, so that the user-requested action may be ultimately performed without having to prompt the user after processing by one or more conditional nodes. In the example described above, the routing plan data may indicate that the user requested a taxi from taxi service X. The routing plan data may include data identifying an intent data processing application of the taxi service X to which the request data is to be routed. Additionally, the routing plan data may indicate that the user is to be authenticated by an authentication component (e.g., an authentication application). Accordingly, the routing plan data may be sent to the authentication application which may perform user authentication. Assuming the authentication is successful, the authentication application may send the routing plan data back to an orchestrator component of the speech processing system. The orchestrator component may determine from the routing plan data that the request data is to be sent to the taxi service intent data processing application following authentication. Accordingly, the orchestrator component may send the request data to the taxi service intent data processing application. The request data may include intent data representing a semantic interpretation of the request data. The intent data may be processed by the taxi service intent data processing application in order to send a taxi to an address associated with the user's account. Notably, in the example described above, the user was not required to repeat the request for a taxi even though the authentication service "interrupted" the routing of the request data to the taxi service intent data processing application.

Determination of routing plan data that describes multiple routing destinations (e.g., conditional routing destinations, such as authentication, as well as user-requested routing destinations) allows a speech processing system to route request data to each destination described in the routing plan data without requiring additional user input. In various examples, determination of such routing plan data may provide a more streamlined and intuitive user experience.

In various examples, during request data routing, a ranking component may be used to rank candidate intent data processing applications for processing request data. In at least some examples, each candidate intent data processing application may be paired with a natural language interpretation of the request data that may be handled by the candidate intent data processing application. The natural language interpretation may be generated by an NLU component and may include an intent of the user (e.g., an action that the user desires be performed) as well as pertinent pieces of information in the text data (e.g., received from an ASR component) that allow an intent data processing application (e.g., a skill) to perform some action using the intent. Such skill/interpretation pairs may be ranked by the ranking component according to a likelihood that a skill/interpretation pair is well-suited for processing the request data.

Described herein is a speech processing routing system that may be used to dynamically determine the appropriate action and/or the appropriate speech processing component to process request data. In various examples, the speech processing routing system may be used to determine routing destinations for request data for processing the request data.

The speech processing routing system may facilitate the routing of request data to appropriate intent data processing applications and/or other speech processing components. In various examples, the speech processing routing system may use machine learning models trained using features computed using user feedback data, context data, and/or other predictive signals in order to determine the appropriate intent data processing application and/or other speech processing component to process request data. In various examples, using machine learning models to dynamically learn routing may improve the accuracy of the routing of speech processing requests, resulting in improved user experiences and/or more pertinent responses to user request data. For example, a machine learning system may dynamically learn from contextual data and/or user feedback data to provide routing exceptions and/or routing flexibility, in contrast to a deterministic routing system. Additionally, in some examples, the speech processing routing components may determine conditional routing policies that may determine that one or more conditional actions may be taken prior to taken a user-requested action. For example, conditional routing policies may require age verification, authentication, and/or providing some additional content and/or request prior to providing a response to the request data.

Speech processing may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network (e.g., network 198 of FIG. 5), or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user request data by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various speech processing systems and components described herein may comprise natural language input data. Natural language input data may be request data in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic interpretation of the inputs (e.g., semantic interpretation data). Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing a user utterance spoken after the wakeword) may be sent to speech processing computing component(s) for further speech processing (e.g., ASR, NLU, etc.). However, in some other examples, speech processing may be performed wholly or partially by the local device that receives the natural language input. In various examples, the wakeword detection component may be used to distinguish between audio that is intended for the speech processing system and audio that is not intended for the speech processing system.

FIG. 1 is a block diagram illustrating an example conditional routing of speech processing request data, according to various embodiments of the present disclosure.

As described in further detail below, request data representing a natural language input to a speech processing system may be processed by an ASR component to generate text data and/or other ASR output data representing the natural language input. The text data and/or other ASR output data may be sent to a natural language component (e.g., NLU 160 in FIG. 2).

In various examples, the natural language component may use one or more statistical machine learning models to generate NLU output data 106 (FIG. 2) that may represent one or more semantic interpretations of the request data. In various examples, a shortlister component (shortlister 110 in FIG. 2) may be a speech processing component that may receive the text data representing the request data generated by ASR component 150 and may determine a subset of intent data processing applications (e.g., skills) that are likely to be appropriate to process the request data. The shortlister may send the subset of skills to the natural language component. The natural language component may generate an N-best list of interpretations of the request data (e.g., one or more interpretations for each intent data processing application of the subset of intent data processing applications determined by shortlister 110).

The N-best list of interpretations may be sent to a ranking component 120. The ranking component 120 may comprise one or more machine learning models effective to receive the N-best list of interpretations as an input and may generate a ranked list 118 of the subset of intent data processing applications determined by the shortlister 110. Each item in the ranked list may be a hypothesis comprising data identifying an intent data processing application for processing the request data paired with a semantic interpretation of the request data for that intent data processing application. Accordingly, a "hypothesis" as used herein may refer to data representing an identity of an intent data processing application and data representing an interpretation of the current request data for that intent data processing application. In various examples below, the hypotheses may be referred to as candidate pairs (e.g., skill identifier data and corresponding request data interpretation data for the skill). The ranked list 118 of candidate pairs may be sent to decider component 132.

Decider component 132 may evaluate the ranked list 118 of N-best hypotheses and may determine routing plan data 134 for the current request data. In various examples, the routing plan data 134 may be determined according to the ranked list 118 and in accordance with one or more conditional routing policies 182. A conditional routing policy may be, for example, one or more rules that specify conditional actions that are to be taken for particular requests. For example, if the top ranked result of ranked list 118 is an intent data processing application that requires authentication, the conditional routing policy 182 may include a rule that specifies that the request data is first sent to an authentication application prior to routing the request data to the user-requested intent data processing application. In another example, the conditional routing policy 182 may specify that a particular offer be presented to the user prior to routing the request data to the user-requested intent data processing application.

Decider component 132 may represent the user-requested action and/or the one or more conditional actions specified by the conditional routing policy 182 as routing nodes 180 in the routing plan data 134. Each routing node 180 of routing nodes 180 may comprise data specifying an action to be taken, an application to take the action (e.g., a skill and/or other speech processing component), and/or input data used by the application to take the action. Additionally, routing plan data 134 may specify an order in which the routing nodes 180 are to be processed. Additionally, routing plan data 134 may specify a priority of the routing nodes 180 with respect to one another.

For example, decider component 132 may determine that the top result of ranked list 118 comprises intent data related to ordering a taxi using an intent data processing application related to Taxi Company A. Additionally, decider component 132 may determine a conditional routing policy 182 indicating that, prior to routing request data for ordering a taxi using Taxi Company A's intent data processing application that the request data should first be routed to an authentication application used to authenticate the user. Decider component 132 may determine another conditional routing policy 182 indicating that, prior to routing request data for ordering the taxi using Taxi Company A's intent data processing application that a first offer should be communicated to the user (e.g., "Would you like to try our premium taxi service free?"). Accordingly, decider component 132 may generate routing plan data 134 that includes a first routing node 180 that specifies that the request data is first routed to an authentication application (e.g., node 1). Routing plan data 134 may further indicate that, upon successful authentication by node 1, the request data should next be sent to Node 2 to communicate the offer to the user. Routing plan data 134 may further indicate that, following communication of the offer, that the request data should be sent to the destination node (e.g., skill 190 used to process the request data to send the tax to the user).

The routing plan data 134 may be sent to an orchestrator 130 of a speech processing system. As described in further detail below, orchestrator 130 may initiate a dialog session and may send the request data and/or the routing plan data 134 between various components of the speech processing system. Orchestrator 130 may determine that the first routing node 180 of routing plan data 134 is Node 1 (e.g., an authentication application). Accordingly, orchestrator 130 may send routing plan data 134 to Node 1. Node 1 may store the routing plan data in a non-transitory computer-readable memory 170 while Node 1 performs a node-specific action. For example, Node 1 may perform the authentication (including requesting user credentials, etc.). Once Node 1 has completed processing, Node 1 may send the resultant data 174 (e.g., data indicating a successful authentication, etc.) along with routing plan data 134 to orchestrator 130. Orchestrator 130 may determine that the next routing node 180 of routing plan data 134 is Node 2. Additionally, orchestrator 130 may determine, using resultant data 174 (e.g., data indicating successful authentication, whether the routing plan data 134 (including the intent data representing the input data) is to be routed to the next routing node 180 indicated in the routing plan data 134. For example, if the resultant data 174 indicates that user authentication was unsuccessful, orchestrator 130 may determine that the intent data should not be routed to the next routing node 180. Conversely, if orchestrator 130 determines that the user authentication was successful (as indicated by resultant data 174) the orchestrator 130 may route the routing plan (including intent data) to the next routing node 180 indicated in the routing plan data 134.

Accordingly, orchestrator 130 may send the routing plan data 134 (e.g., including the intent data) to Node 2 for processing. During node-specific processing, Node 2 may store routing plan data 134 in a non-transitory computer-readable memory 172. For example, Node 2 may generate text data corresponding to the offer of a premium taxi service and may generate an executable command that may cause TTS to output audio data representing the text data. The resultant data 176 along with routing plan data 134 may be sent from Node 2 to orchestrator 130. Orchestrator 130 may determine that the final routing node is the destination node implicated by the user's original request (e.g., the request for a taxi from Taxi Company A). Accordingly, the routing plan data 134 including the intent data representing the input user request may be sent to the destination node (e.g., a skill 190 of Taxi Company A) for processing.

Advantageously, using the routing plan data 134, as described above, the destination node (e.g., the skill associated with Taxi Company A) may process the request data to perform the originally-requested action (e.g., the sending of a taxi) without requiring the user to repeat the request after one or more intervening actions (e.g., the authentication by a separate application and/or the provision of an offer by a separate application).

Figure 2:
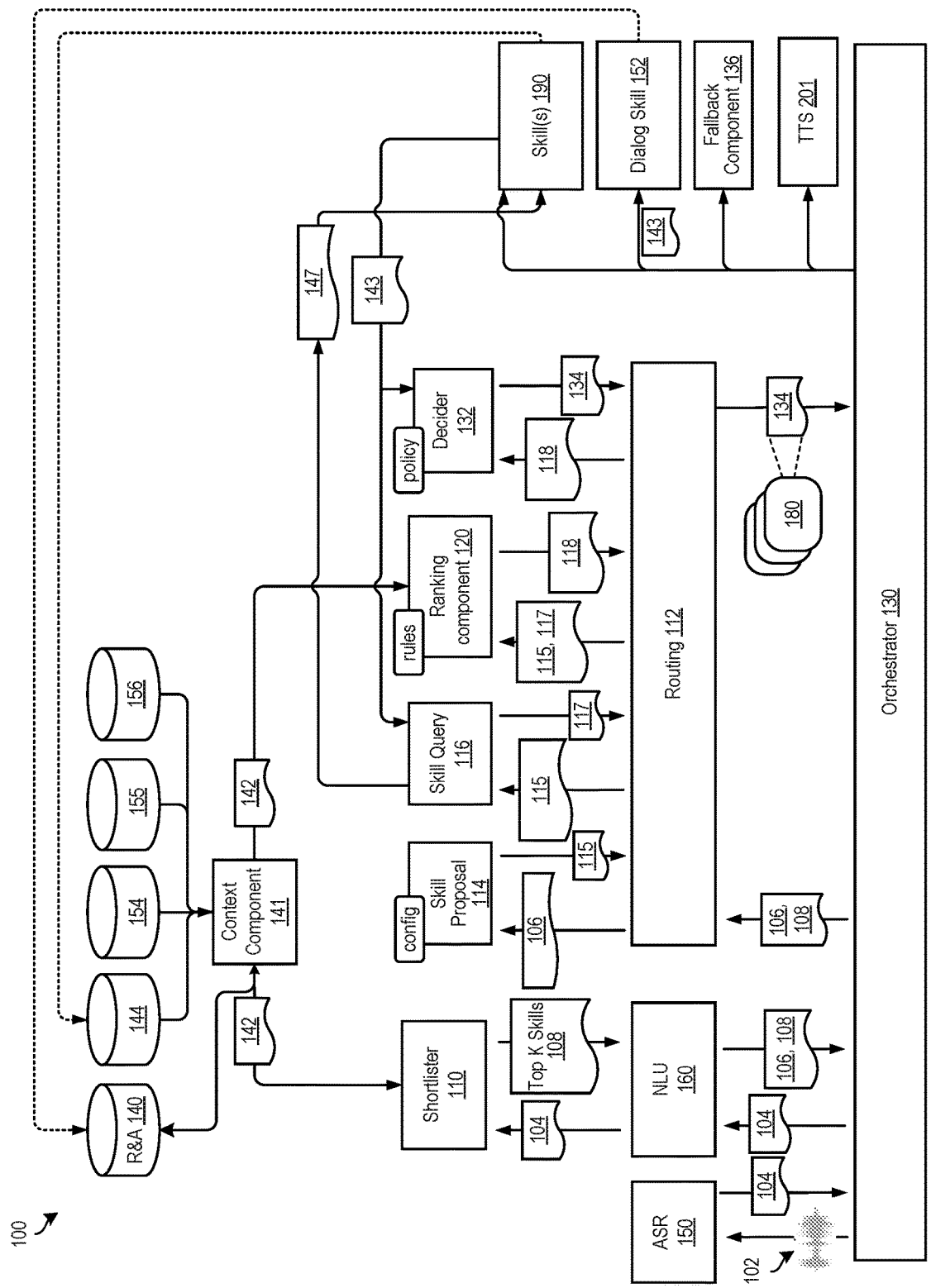
FIG. 2 is a block diagram illustrating an example of speech processing routing, according to various embodiments of the present disclosure.

FIG. 2 is a block diagram illustrating an example speech processing routing system, according to various embodiments of the present disclosure. The various components illustrated FIG. 2 may be located on the same or different physical devices. Communication between various components illustrated in FIG. 2 may occur directly or across a network. A speech processing-enabled device may capture audio using an audio capture component, such as one or more microphone(s). The speech processing enabled device may send audio data 102 (e.g., corresponding to request data) to an orchestrator 130 of the speech processing system 100. The speech processing enabled device may also send metadata (e.g., including device identifiers, device type data, contextual data, IP address data, room location data, etc.) to the orchestrator 130. The components depicted in FIG. 2, including components of a speech processing system may be generally referred to as spoken language processing components, a speech processing system 100 a spoken language processing system, speech processing components, and/or a speech processing routing system. Additionally, in various examples, the components depicted in FIG. 2 may process written input (e.g., text data) in addition to spoken input.

Upon receipt by the speech processing system 100, the audio data 102 may be sent to an orchestrator 130. The orchestrator 130 may include memory and logic that enables the orchestrator 130 to initiate a dialog session and to transmit various pieces and forms of data to various components of the system, as described in further detail below.

The orchestrator 130 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 104 generated thereby to orchestrator 130 that may, in turn, send the text data 104 to natural language component 160. As previously described, the text data 104 may include one or more ASR hypotheses. The text data 104 may include a top scoring hypothesis of the speech represented in the audio data 102 or may include an N-best list including a group of hypotheses of the speech represented in the audio data 102, and potentially respective scores ASR processing confidence scores. As previously described, in some other examples, the ASR component 150 (and/or other components of the speech processing system 100) may generate other metadata associated with the request data such as an overall request data confidence score, per-word (e.g., per token) confidence scores for the request data, request data duration, stream duration (e.g., duration of the stream of audio data from speech processing enabled device to speech processing system 100), a number of tokens output by ASR, etc.

The natural language component 160 attempts to make a semantic interpretation of the phrases or statements represented in the text data input therein. That is, the natural language component 160 determines one or more meanings associated with the phrases or statements represented in the text data 104 based on individual words represented in the text data 104. The natural language component 160 interprets a text string to derive an intent of the user (e.g., an action that the user desires be performed) as well as pertinent pieces of information in the text data that allow a device (e.g., the speech processing enabled device, the speech processing system 100, a computing device(s) implementing a skill, etc.) to complete the intent. For example, if the text data 104 corresponds to "Set temperature to 74 degrees," the natural language component 160 may determine the user intended to invoke a climate intent with a target temperature value slot of 74 degrees Fahrenheit. As previously described, in addition to the NLU intent and slot data, the natural language component 160 may generate other metadata associated with the request data (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the natural language component 160 is referred to as NLU output data 106.

Natural language component 160 may send the text data 104 and/or some of NLU output data 106 (such as intents, recognized entity names, slot values, etc.) to a shortlister 110. The shortlister 110 may comprise one or more machine learning models that may be effective to predict a subset of skills that are most likely to be able to correctly process the request data, based on the input of the text data 104 and/or the NLU output data 106. In addition, the shortlister 110 may call the ranking and arbitration component 140 to request features pre-computed by the ranking and arbitration component 140 according to features used as inputs by the machine learning models of shortlister 110. As previously described, the shortlister 110 may define source data used to compute the features and/or may specify functions used to generate the features from the source data (e.g., formulae and/or functions) prior to runtime processing of request data. The ranking and arbitration component 140 may precompute the features according to the specified feature definitions supplied by shortlister 110 and by the other components of speech processing system 100 and may store the precomputed features in memory. Ranking and arbitration component 140 may generate indexes that may be used to retrieve the precomputed features during runtime (e.g., through an API). Accordingly, during runtime processing, shortlister 110 may retrieve the precomputed features from ranking and arbitration component 140 and may use the precomputed features (among other inputs) to predict a subset of skills that are most likely to be appropriate to process the current request data. Accordingly, shortlister 110 may send the top K skills 108 to natural language component 160. Natural language component 160 may thereafter perform skill-specific NLU processing for the skills in the top K skills 108 to determine skill-specific intents, slots, and/or named entities. NLU output data 106 may include such skill-specific data (e.g., skill-specific N-best hypotheses).

Ranking and arbitration component 140 may communicate with various systems in order to obtain source data used to precompute features. For example, ranking and arbitration component 140 may communicate with feedback storage 144 to receive user feedback data (e.g., explicit and/or implicit user feedback related to user satisfaction with processing of request data). In various examples, the user feedback data may be user-specific and/or device specific and may indicate whether a user was satisfied or not satisfied with a particular interaction with speech processing system 100. In various examples user feedback data may be predicted for request data prior to processing the request data using a skill 190. In various examples, user feedback data may be used to pre-compute various features used by machine learning models of speech processing system 100. Accordingly, in some examples, the skills selected for processing particular request data may be determined based at least in part on skills that a user (or a group of similar users) has responded positively to in the past.

Additionally, ranking and arbitration component 140 may communicate with endpoint context system 154, which may provide context data at the conclusion of a user interaction with the speech processing system 100. In another example, ranking and arbitration component 140 may communicate with skill data 156 to determine information from the skill regarding past interactions with the skill and/or data acquired by the skill. Additionally, ranking and arbitration component 140 may communicate with other data sources 155, as new services are added and/or as new data types that may be useful for routing prediction are made available. In addition to ranking and arbitration component 140 using context data 142 to precompute features used by various machine learning models of the routing system of the speech processing system 100, a context component 141 may receive the context data 142. The context component 141 may provide the context data directly to both ranking and arbitration component 140 as well as to various components of the routing system of speech processing system 100. For example, the context component 141 may send context data 142 to shortlister 110 and/or ranking component 120 in order to determine a shortlist of skills 190 for particular request data and/or in order to rank the shortlisted skills.

NLU output data 106 and top K intent data processing applications 108 may be sent by natural language component 160 to orchestrator 130. Orchestrator 130 may send the top K intent data processing applications 108 and the NLU output data 106 to routing component 112. Routing component 112 may send the top K intent data processing applications 108 and NLU output data 106 to skill proposal component 114. Skills 190 may subscribe to particular intents using skill proposal component 114. Accordingly, skill proposal component 114 may receive the NLU output data 106 and may determine whether any of the included intents correspond to one or more of skills 190 that have registered for the particular intent. If so, skill proposal component 114 may generate candidate data comprising <Intent, Skill> candidate pairs 115. The candidate pairs 115 may be sent to routing component 112 and may be sent by routing component 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request included in the current request data. Skill query service 116 provides a capability for intent data processing applications (e.g., skills) to provide signals to ranking component 120 that indicate how well the particular intent data processing application may handle the current request data. The ranking component 120 may use such input signals (e.g., signal 117) during ranking of the candidate pairs 115. Skill query service 116 may send a signal 117 indicating what skills can fulfill a particular request (and/or what skills are unable to fulfill the request), and/or how well the skill is able to fulfill the request. The signal 117 may be sent to routing component 112. Routing component 112 may send the signal 117 along with the candidate pairs 115 to a ranking component 120. As depicted in FIG. 1, skills 190 may send a signal 143 to skill query service 116 to indicate situations in which a skill may opt out of processing a particular request (e.g., if the device sending the request data does not include a display screen, etc.). In various examples, the signal 143 sent by skills 190 to skill query service 116 may be skill and/or request-specific. Additionally, skill query service 116 may send intent requests 147 to skills 190. Intent requests 147 may include the candidate pair 115 along with context data 142 and may be a request for an estimate of how well an intent data processing application (e.g., a skill 190) may be able to handle the request. In response, the intent data processing application may determine how well the skill may be able to process/fulfill the processing of the request data and may provide a signal to indicate how well the skill may be able to process/fulfill the request data to ranking component 120. For example, a particular skill may determine whether or not the intent included in the intent request 147 is an intent that the skill is effective to process and may provide signal 143 to ranking component indicating whether or not the skill is able to process the relevant intent. Ranking component 120 may, in turn, use the signal 143 as an input to one or more machine learning models used to rank the list of candidate pairs 115. In some examples, the signal 143 may also be sent to decider component 132 and decider component 132 may generate plan data 134 based at least in part on the signal 143.

Ranking component 120 may include one or more statistical machine learning models effective to rank the candidates included in candidate pairs 115. In order to rank the candidate pairs 115, ranking component 120 may generate confidence scores for each corresponding candidate pairs 115. A confidence score may indicate that the corresponding skill 190 and/or intent of the candidate pair is appropriate to process the request. Ranking component 120 may compute features using the candidate pairs 115 and signal 117 in order to predict the ranking of the skills 190 included in the candidate pairs 115. The features computing during processing of the request data (sometimes referred to as "runtime features") may comprise a feature representation of the list of candidate pairs 115 and/or a representation of the signal 117. Additionally, ranking component 120 may query ranking and arbitration component 140 for precomputed features that have been defined for use by ranking component 120.

As previously described, the precomputed features may be determined based on contextual data, user feedback data, past usage data, skill data, previous rankings of ranking component 120, etc. Additionally, ranking component 120 may compute runtime features using context data 142, user feedback data from feedback storage 144, and/or other data sources. In various examples, the loss function for the machine learning models of ranking component 120 may optimize based on user satisfaction scores computed using user feedback data from feedback storage 144.

Ranking component 120 may generate a ranked list 118 of the candidate skills indicated in candidate pairs 115. In at least some examples, the ranking component 120 may use a deep neural network as a machine learning model for determining the ranked list 118. In addition, ranking component 120 (and/or some other speech processing system 100 component, such as decider component 132) may determine routing plan data 134 that may include routing nodes 180. Routing nodes 180 may include indications of intent data processing applications (e.g., skills 190) to which request data should be routed for processing. In various examples, routing nodes 180 may indicate the types of actions to be performed by the various routing destinations represented by the routing nodes 180. Routing plan data 134 may indicate an order in which to send the request data to the routing nodes 180 for processing.

In another example, the decider component 132 may store policies that may be used to generate the routing plan data 134. The policies may include data that defines conditional routing nodes 180 that should be routed to prior to routing the request data to a destination node (e.g., an intent data processing application) that is configured to handle the user's request. The routing plan data 134 may define a one or more target skills 190 (and/or other intent data processing applications) to process the request data. As described above, the target skill 190 may be selected as the top-ranked hypothesis determined by the ranking component 120. In some other examples, the decider component 132 may select a target skill 190 based on a policy, as described above. In some examples, the ranking component 120 may determine that two different skills are equally applicable for processing the request data. In such examples, the decider component 132 may determine that disambiguation should occur. Additionally, decider component 132 may determine, based on one or more policies, that authentication by a first application should occur prior to routing the intent data to a particular skill 190 for processing the user's request data. Accordingly, in the example, decider component 132 may generate routing plan data 134 including a first routing node 180 used to route the request data to the first application for authentication. Additionally, the routing plan data 134 may include a second routing node 180 for routing the request data to the skill 190 for processing the user's request data (assuming that authentication was successful).

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan data 134 should be to determine the second highest ranked hypothesis of the ranking component 120. Accordingly, in some examples, the routing plan data may include a routing node 180 representing the second highest ranked hypothesis. The routing plan data 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The speech processing system 100 may also include a TTS component 201 that synthesizes speech (e.g., generates audio data) corresponding to text data input therein. Accordingly, one or more of skills 190, dialog skill 152, ASR component 150, and/or orchestrator 130. The TTS component 201 may perform speech synthesis using one or more different methods. In one method of synthesis called unit selection, the TTS component 201 matches text data against one or more databases of recorded speech. Matching units are selected and concatenated together to form audio data. In another method of synthesis called parametric synthesis, the TTS component 201 varies parameters such as frequency, volume, and noise to create an artificial speech waveform output. Parametric synthesis uses a computerized voice generator, sometimes called a vocoder.

Figure 3:
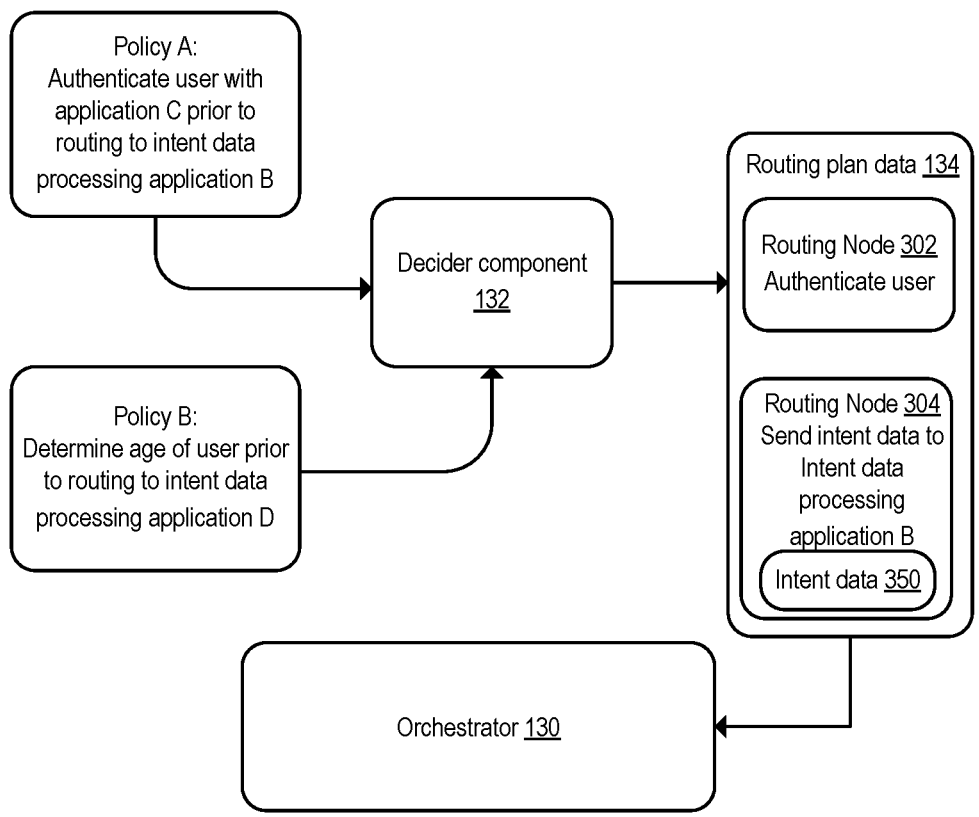
FIG. 3 is a block diagram illustrating generation of a routing plan by a decider component, in accordance with various embodiments described herein.

FIG. 3 is a block diagram illustrating generation of routing plan data 134 by a decider component 132, in accordance with various embodiments described herein. In the example depicted in FIG. 3, policy A and policy B are sent to decider component 132. Policy A and policy B may be data that comprises one or more rules and/or machine learning models used to determine routing plan data 134 by decider component 132. In the example depicted in FIG. 3, policy A comprises a rule that instructs decider component 132 to determine routing plan data that authenticates a user with an application C prior to routing request data to intent data processing application B for processing. Accordingly, when decider component 132 receives a top hypothesis (e.g., intent data for a particular top-ranked skill) that indicates that intent data processing application B is to be selected for processing request data, decider component 132 may generate routing plan data 134 that authenticates the user prior to routing the request data to intent data processing application B according to policy A.

In the example depicted in FIG. 3, policy B comprises a rule that the age of the user should be determined prior to routing request data to intent data processing application D. In the example, intent data processing application D may, in some cases, output content and/or take other actions that are not suitable for children. Accordingly, policy B may cause decider component 132 to generate routing plan data that first determines the age of a user when request data would otherwise be routed directly to intent data processing application D.

In the example depicted in FIG. 3, decider component 132 may have determined that a request data representing a user utterance should be sent to intent data processing application B for processing. Additionally, decider component 132 may determine that policy A indicates that prior to routing request data to intent data processing application B, that a user should be authenticated by application C. Accordingly, decider component 132 may generate routing plan data 134 that comprises routing node 302, instructing orchestrator 130 to send a request to authenticate the user to application C. Routing plan data 134 may further comprise routing node 304 that instructs orchestrator 130 to send intent data 350 (e.g., the request data) to intent data processing application B if authentication was successful. Routing nodes (e.g., routing nodes 302, 304, etc.) may be structured data that may indicate a destination for routing of request data and/or other data associated with particular request data (e.g., context data such as a device ID at which a request was received, a user ID, etc.). In some examples, the routing nodes may indicate an action to be performed by each destination. For example, routing node 302 may indicate a destination of the authentication application (e.g., an IP address and/or port number, etc.) and an identification of the action to be performed (e.g., authentication of a user ID and/or a specific speech processing-enabled device).

As previously described, in some examples, the routing plan data 134 may be passed to each application/component and may be stored in memory during processing by each application component. For example, routing plan data 134 may be sent to application C and stored in a non-transitory computer-readable memory associated with application C while application C attempts to authenticate the user. After authentication, application C may send data indicating a successful (or unsuccessful) authentication along with the routing plan data 134 back to orchestrator 130. Orchestrator 130 may, in turn, send the routing plan data 134 and the request data (e.g., intent data) to intent data processing application B, as indicated by routing node 304 of the routing plan data 134.

Figure 4:
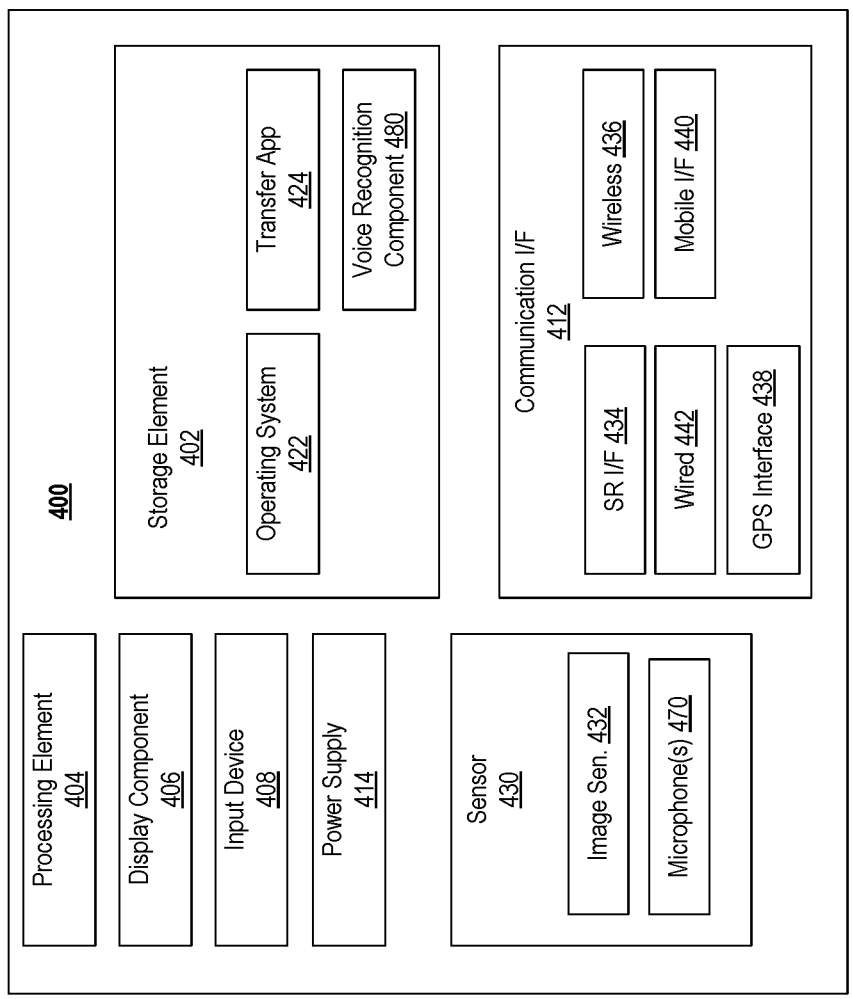
FIG. 4 is a block diagram showing an example computing device that may be used in accordance with various embodiments described herein.

FIG. 4 is a block diagram showing an example system 400 of a computing device that may be used to implement, at least in part, speech processing system 100, in accordance with various aspects of the present disclosure. It will be appreciated that not all devices will include all of the components of the system 400 and some user devices may include additional components not shown in the system 400. The system 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to speech processing system 100. The storage element 402 can include one or more different types of memory, data storage, or computer-readable storage media devoted to different purposes within the system 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the system 400 and various hardware thereof. A transfer application 424 may be configured to receive images, audio, and/or video from another device (e.g., a mobile device, image capture device, and/or display device) or from an image sensor 432 and/or microphone 470 included in the system 400. In some examples, the transfer application 424 may also be configured to send the received voice requests to one or more voice recognition servers (e.g., speech processing system 100).

When implemented in some user devices, the system 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The system 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the system 400. These input devices 408 may be incorporated into the system 400 or operably coupled to the system 400 via wired or wireless interface. In some examples, system 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as speech processing system 100. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The system 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the system 400. A wired communication module 442 may be configured to communicate according to the USB protocol or any other suitable protocol.

The system 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
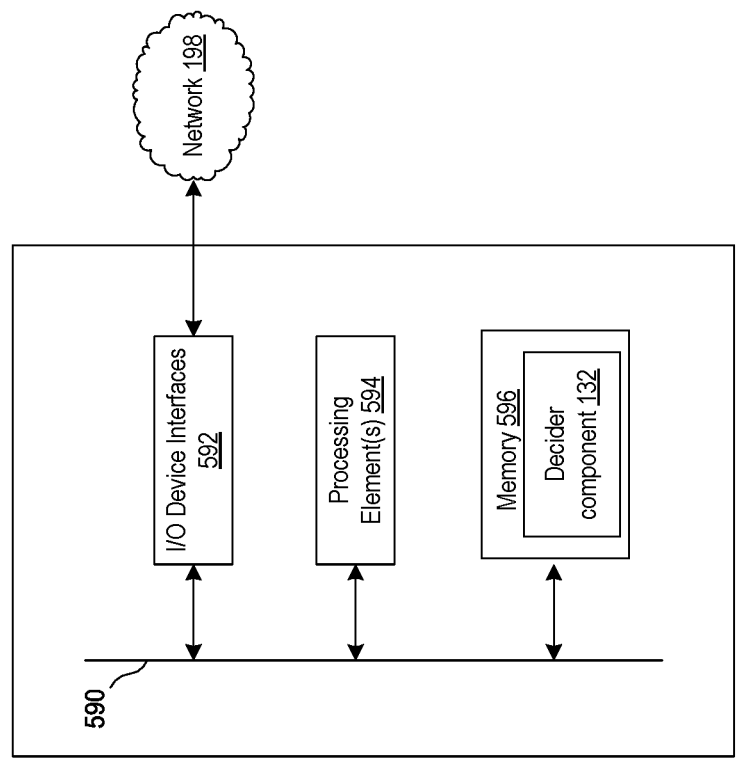
FIG. 5 is another block diagram showing another example computing device that may be used in accordance with various embodiments described herein.

FIG. 5 is a block diagram conceptually illustrating example components of a remote device, such as a computing device executing a particular skill 190, a computing device executing one or more components of speech processing system 100 (e.g., ASR processing components, NLU processing components, etc.) and/or command processing. Multiple computing devices may be included in the system, such as one speech processing computing device for performing ASR processing, one speech processing computing device for performing NLU processing, one or more skill computing device(s) implementing skills 190, etc. In operation, each of these devices (or groups of devices) may include non-transitory computer-readable and computer-executable instructions that reside on the respective device, as will be discussed further below.

Each computing device of speech processing system 100 may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the ranking component 120, skills 190, shortlister 110, etc., when loaded from memory 596. In various further examples, memory 596 may be effective to store instructions effective to program controllers/processors 594 to perform the various techniques described above in reference to ranking and arbitration component 140, decider component 132, and/or the dynamic routing adjustment described above in reference to FIGS. 1-4. Accordingly, in FIG. 5, decider component 132 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of speech processing system 100 may also include memory 596 for storing data and controller/processor-executable instructions. Each memory 596 may individually include one or more non-volatile storage types such as magnetic storage, optical storage, solid-state storage, etc. Each computing device of speech processing system 100 may also be connected to removable or external non-volatile memory and/or storage (such as a removable memory card, memory key drive, networked storage, etc.) through respective input/output device interfaces 592. In various examples, the feature data described above in reference to ranking and arbitration component 140, may be stored in memory 596.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of speech processing system 100 may include an address/data bus 590 for conveying data among components of the respective device. Each component within a computing device of speech processing system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the speech processing system 100, as described herein, are exemplary, and may be located as a stand-alone device or may be included, in whole or in part, as a component of a larger device or system.

Figure 6:
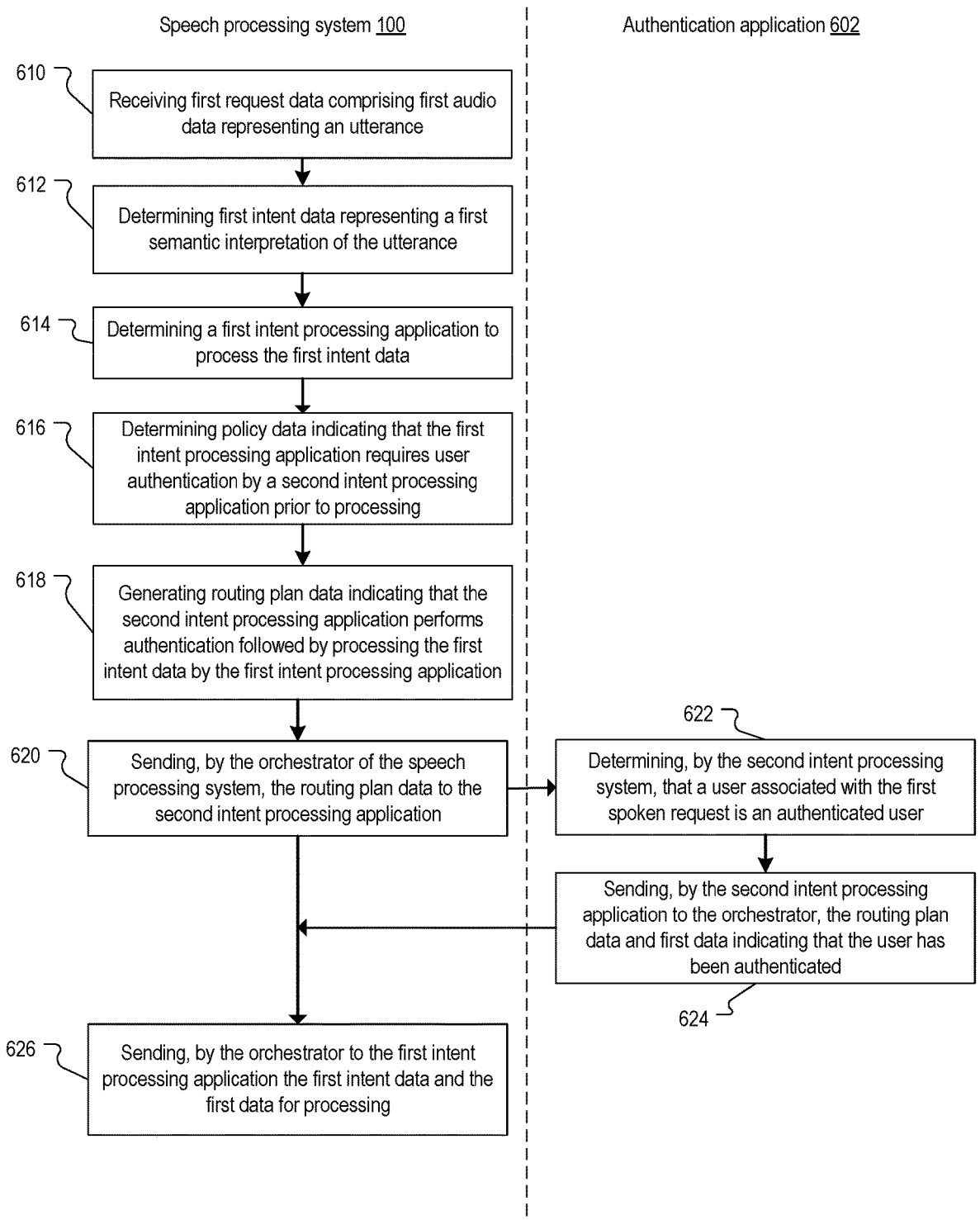
FIG. 6 depicts a flow chart showing an example process for determining routing plan data according to policy data, in accordance with various aspects of the present disclosure.

FIG. 6 depicts a flow chart showing an example process for determining routing plan data according to policy data, in accordance with various aspects of the present disclosure. Those portions of FIG. 6 that have been previously discussed in reference to FIGS. 1-5 may not be described again for purposes of clarity and brevity. The actions of the process of FIG. 6 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

The process of FIG. 6 may begin at action 610, at which the speech processing system 100 may receive first request data comprising first audio data representing an utterance. The utterance may be a request spoken by a user of a speech processing-enabled device. The utterance may be transformed into audio data representing the utterance. Processing may continue to action 612, at which first intent data representing a first semantic interpretation of the utterance may be determined. In various examples, ASR may be performed on the first audio data to generate ASR output data including text data representing the utterance. NLU processing may be performed on the ASR output data to generate the first intent data representing the first semantic interpretation of the utterance.

Processing may continue at action 614, at which a first intent data processing application may be determined for processing the first intent data. In various examples, the decider component 132 may select the first intent data processing application (e.g., a skill) for processing the intent data as the first intent data processing application may be the top-ranked result from ranking component 120 for the request data. Processing may continue from action 614 to action 616, at which policy data may be determined by the decider component 132. The policy data may indicate that the first intent data processing application requires user authentication by a second intent data processing application prior to processing by the first intent data processing application.

Processing may continue from action 616 to action 618, at which decider component 132 may generate routing plan data. The routing plan data may indicate that the second intent data processing application (e.g., an authentication application) performs authentication prior to processing by the first intent data processing application. In various examples, the routing plan data may comprise a first routing node indicating a location of the second intent data processing application (e.g., an IP address and/or port number) and an indication of the action to be performed by the second intent data processing application (e.g., authentication, which may be associated with a port number). The routing plan data may further comprise a second routing node indicating a location of the first intent data processing application (e.g., an IP address and/or port number) along with an indication of the action to be performed by the first intent data processing application (e.g., responding to the user's request, sending a taxi, ordering a pizza, starting a movie, starting a game, etc.). Additionally, the routing plan data may include data indicating an order in which to route data to the routing nodes. In the current example, the routing plan data may comprise data indicating that request data should first be routed to the second intent data processing application for authentication followed by routing to the first intent data processing application to perform the relevant action (assuming successful authentication).

Processing may continue from action 618 to action 620, at which the orchestrator 130 may send the routing plan data to the second intent data processing application. At action 622, the second intent data processing application may store the routing plan data in memory while authenticating the user according to the action specified by the routing plan data (e.g., by the first routing node of the routing plan data). Accordingly, at action 622, the second intent data processing application (authentication application 602) may authenticate the user speaking the request (e.g., by requesting a PIN, password, etc.). Processing may continue from action 622 to action 624, at which the second intent data processing application (e.g., authentication application 602) may send the routing plan data to the orchestrator along with first data indicating whether or not the user has been authenticated.

Processing may continue from action 624 to action 626, at which the orchestrator may receive the routing plan data from the second intent data processing application (e.g., authentication application 602) and may send the routing plan data along with the request data (e.g., first intent data) to the first intent data processing application for responding to the user request to perform an action. In the example, the orchestrator may determine the appropriate routing destination for the intent data using the second routing node of the routing plan data. Additionally, in at least some examples, the orchestrator may determine that the user has been successfully authenticated. In some other examples, the first data indicating authentication may be sent to the first intent data processing application along with the first intent data. Accordingly, the first intent data processing application may use the first data to determine whether or not the user has been properly authenticated. Additionally, the first intent data processing application may process the first intent data to perform the user-requested action.

Figure 7:
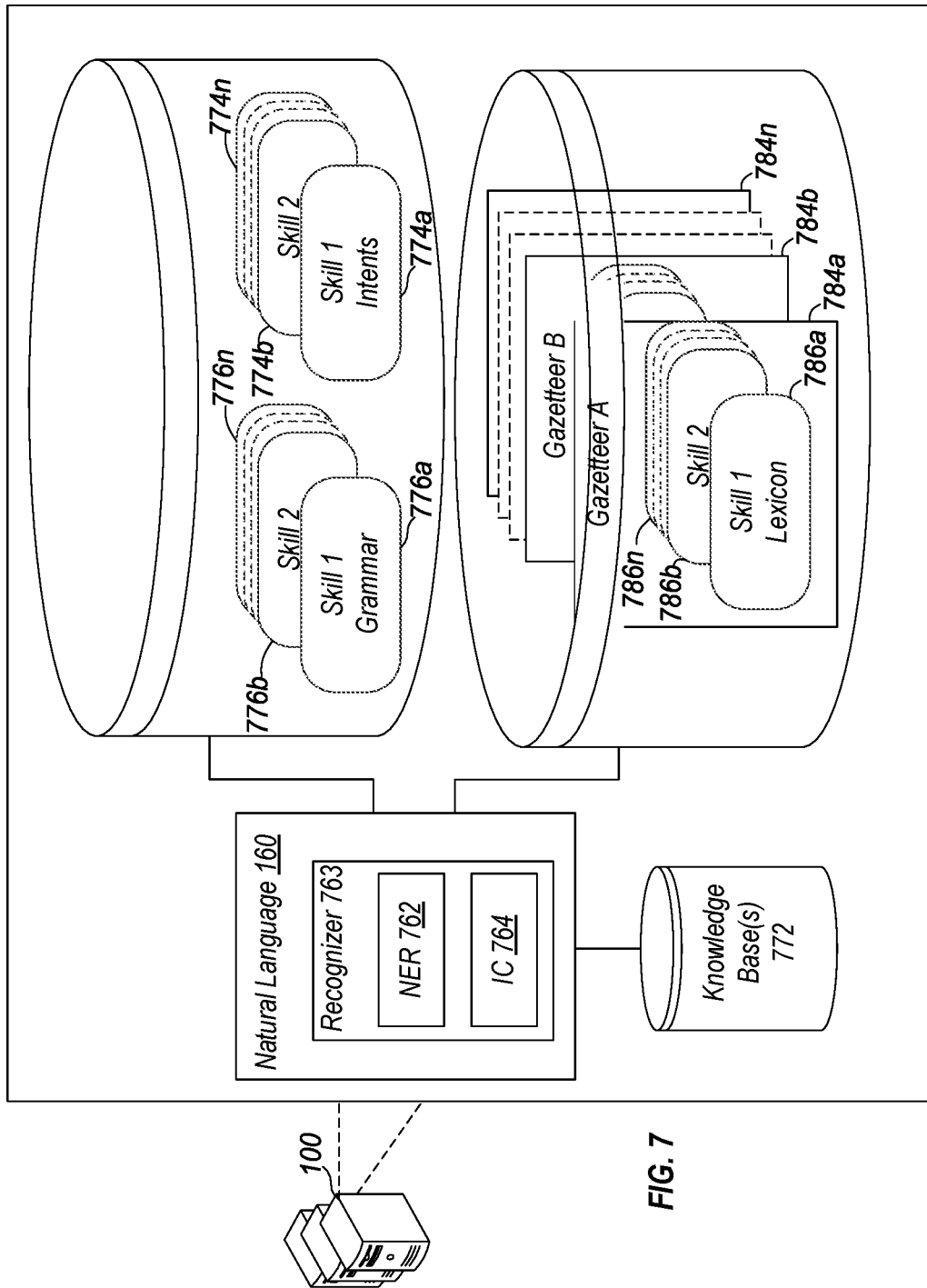
FIG. 7 is a conceptual diagram illustrating how natural language understanding processing is performed according to embodiments of the present disclosure.

FIG. 7 illustrates how NLU processing is performed on text data. Generally, the Natural language component 160 attempts to make a semantic interpretation of text data input thereto. That is, the natural language component 160 determines the meaning behind text data based on the individual words and/or phrases represented therein. The natural language component 160 interprets text data to derive an intent of the user as well as pieces of the text data that allow a device (e.g., a speech processing enabled device, the speech processing system 100, etc.) to complete that action.

The natural language component 160 may process text data including several ASR hypotheses. The natural language component 160 may process all (or a portion of) the ASR hypotheses input therein. Even though the ASR component 150 may output multiple ASR hypotheses, the natural language component 160 may be configured to only process with respect to the top scoring ASR hypothesis. Additionally, as described herein, the ASR component 150 may generate confidence scores associated with each hypothesis.

The natural language component 160 may include one or more recognizers 763. Each recognizer 763 may be associated with a different skill. Each recognizer 763 may process with respect to text data input to the natural language component 160. Each recognizer 763 may operate at least partially in parallel with other recognizers 763 of the natural language component 160.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity that may be applicable to processing performed by a skill. The NER component 762 (or other component of the natural language component 160) may also determine whether a word refers to an entity whose identity is not explicitly mentioned in the text data, for example "him," "her," "it" or other anaphora, exophora or the like.

Each recognizer 763, and more specifically each NER component 762, may be associated with a particular grammar model and/or database, a particular set of intents/actions (e.g., in intents database 774), and a particular personalized lexicon 786. Each gazetteer 784 may include skill-indexed lexical information associated with a particular user and/or speech processing enabled device. For example, a Gazetteer A (784a) includes skill-indexed lexicon 786a to 786n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 762 applies grammar models 776 and lexicon 786 to determine a mention of one or more entities in text data. In this manner, the NER component 762 identifies "slots" (corresponding to one or more particular words in text data) that may be used for later processing. The NER component 762 may also label each slot with a type (e.g., noun, place, city, artist name, song name, etc.). As previously described, each recognizer 763 may generate confidence scores associated with each named entity and/or with each match of a named entity. In at least some examples, pre-computed features generated by the ranking and arbitration component 140 may be used by the NER component 762 and/or by natural language component 160, generally, in order to generate the N-best list of intents and/or skills for processing a particular request data.

Each grammar model 776 includes the names of entities (i.e., nouns) commonly found in speech about the particular skill to which the grammar model 776 relates, whereas the lexicon 786 is personalized to the user and/or a speech processing enabled device from which the user input originated. For example, a grammar model 776 associated with a shopping skill may include a database of words commonly used when people discuss shopping.

Each recognizer 763 may also include an intent classification (IC) component 764. An IC component 764 parses text data to determine an intent(s). An intent represents an action a user desires be performed. An IC component 764 may communicate with an intents database 774 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 774.

The intents identifiable by a specific IC component 764 are linked to skill-specific grammar models 776 with "slots" to be filled. Each slot of a grammar model 776 corresponds to a portion of text data that the system believes corresponds to an entity. For example, a grammar model 776 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (e.g., implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as hidden Markov models, maximum entropy models, log linear models, conditional random fields (CRF), and the like. For example, an NER component 762 implemented by a music recognizer may parse and tag text data corresponding to "play Song Y by the Band X" as {Verb}: "Play," {Object}: "Song Y," {Object Preposition}: "by," and {Object Modifier}: "the Band X." The NER component 762 identifies "Play" as a verb, which an IC component 764 may determine corresponds to a <PlayMusic> intent. At this stage, no determination has been made as to the meaning of "Song Y" and "the Band X," but based on grammar rules and models, the NER component 762 has determined the text of these phrases relates to the grammatical object (i.e., entity) of the user input represented in the text data.

The models linked to the intent are then used to determine what database fields should be searched to determine the meaning of these phrases, such as searching a user's gazetteer 784 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (e.g., in the knowledge base 772). For example, if the text data includes "play songs by the Band X," after failing to determine an album name or song name called "songs" by "the Band X," the NER component 762 may search the database for the word "songs." In the alternative, generic words may be checked before the gazetteer information, or both may be tried, potentially producing two different results.

An NER component 762 may tag text data to attribute meaning thereto. For example, an NER component 762 may tag "play Song Y by the Band X" as: {skill} Music, {intent} <PlayMusic>, {artist name} Band X, {media type} SONG, and {song title} Song Y. For further example, the NER component 762 may tag "play songs by the Band X" as: {skill} Music, {intent}<PlayMusic>, {artist name} Band X, and {media type} SONG.

The natural language component 160 may generate cross-skill N-best list data, which may include a list of NLU hypotheses output by each recognizer 763. A recognizer 763 may output tagged text data generated by an NER component 762 and an IC component 764 operated by the recognizer 763, as described above. Each NLU hypothesis including an intent indicator and text/slots may be grouped as an NLU hypothesis represented in cross-skill N-best list data. Each NLU hypothesis may also be associated with one or more respective confidence score(s) for the NLU hypothesis. For example, the cross-skill N-best list data may be represented as, with each line representing a separate NLU hypothesis:

[0.95] Intent: <PlayMusic> ArtistName: Band X SongName: Song Y

[0.95] Intent: <PlayVideo> ArtistName: Band X VideoName: Song Y

[0.01] Intent: <PlayMusic> ArtistName: Band X AlbumName: Song Y

[0.01] Intent: <PlayMusic> SongName: Song Y

Ranking component 120 may assign a particular confidence score to each NLU hypothesis input therein. As previously described, machine learning models of the ranking component 120 may use precomputed features generated by ranking and arbitration component 140 as inputs along with the cross-skill N-best list data in order to generate the confidence scores for each NLU hypothesis of the cross-skill N-best list data. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity recognition component 762.

The ranking component 120 may apply re-scoring, biasing, and/or other techniques to determine the top scoring NLU hypotheses. To do so, the ranking component 120 may consider not only the data output by the entity recognition component 762, but may also consider other data such as skill rating, popularity data, context data, and/or other features computed by ranking and arbitration component 140.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for routing requests for speech processing, comprising:
   receiving first audio data representing a first spoken request;
   determining first intent data representing a first semantic interpretation of the first audio data;
   determining a ranked list of intent data processing applications to process the first intent data;
   selecting a top-ranked intent data processing application from among the ranked list of intent data processing applications to process the first intent data;
   determining policy data indicating that the top-ranked intent data processing application requires user authentication by an authentication application prior to processing;
   generating, by a speech processing system, routing plan data using the policy data, wherein the routing plan data indicates that the first intent data processing application performs authentication and that the first intent data is processed by the top-ranked intent data processing application after authentication;
   sending, by an orchestrator of the speech processing system, the routing plan data to the authentication application prior to sending the first intent data to the top-ranked intent data processing application;
   determining, by the authentication application, that a user associated with the first spoken request is an authenticated user;
   sending, by the authentication application to the orchestrator, the routing plan data and first data indicating that the user associated with the first spoken request has been authenticated;
   sending, by the orchestrator to the top-ranked intent data processing application using the routing plan data, the first intent data; and
   processing, by the top-ranked intent data processing application, the first intent data to perform a first action.

2. The method of claim 1, further comprising:
   determining, by the orchestrator upon receiving the first data from the authentication application, that the routing plan data indicates that the first intent data be sent to the top-ranked intent data processing application; and
   determining, by the authentication application, that the first data indicates that the user associated with the first spoken request is the authenticated user.

3. The method of claim 1, further comprising:
   storing, by the authentication application, the routing plan data in a non-transitory computer-readable memory during the determining that the user associated with the first spoken request is the authenticated user; and
   searching the non-transitory computer-readable memory, by the authentication application, for the routing plan data.

4. A method comprising:
   receiving first data representing a first natural language input;
   generating second data representing a first semantic interpretation of the first natural language input;
   determining a ranked list of intent data processing applications for processing the second data;
   selecting a first intent data processing application from among the ranked list to process the second data;
   generating first routing data indicating that a second intent data processing application take a first action prior to sending the second data to the first intent data processing application for processing;

sending the first routing data to the second intent data processing application;
receiving third data from the second intent data processing application, the third data comprising a result of the second intent data processing application taking the first action; and
sending the second data to the first intent data processing application.

5. The method of claim 4, further comprising:
receiving the first routing data from the second intent data processing application; and
determining from the first routing data that the second data be sent to the first intent data processing application.

6. The method of claim 4, further comprising determining fourth data comprising a policy related to the first intent data processing application, the policy indicating that the second intent data processing application performs the first action prior to sending the second data to the first intent data processing application.

7. The method of claim 6, further comprising:
determining, from the fourth data, that a third intent data processing application take a second action prior to processing the second data by the first intent data processing application;
determining, from the fourth data, that the first action has priority over the second action; and
after receiving the third data from the second intent data processing application, generating second routing data indicating that the third intent data processing application take the second action.

8. The method of claim 4, further comprising:
sending the second data to the second intent data processing application;
receiving the first routing data and the second data from the second intent data processing application; and
sending the second data, the third data, and the first routing data to the first intent data processing application.

9. The method of claim 4, further comprising generating, by the first intent data processing application, audio data representing a response to the first natural language input, wherein the audio data is generated based at least in part on the second data and the first routing data.

10. The method of claim 4, further comprising:
generating, by the second intent data processing application, fourth data representing a request for user authentication information;
receiving fifth data comprising the user authentication information from a speech processing-enabled device, wherein the third data comprises an indication that a user has been authenticated; and
sending the third data to the first intent data processing application.

11. The method of claim 4, further comprising:
receiving, from the second intent data processing application, fourth data comprising a policy indicating that the second intent data processing application performs the first action prior to sending input data corresponding to the first semantic interpretation to the first intent data processing application for processing; and
generating the first routing data based at least in part on the fourth data.

12. The method of claim 4, further comprising:
receiving the first routing data from the second intent data processing application;
determining a routing destination indicated by the first routing data to which to send the second data; and
sending the first routing data to the routing destination.

13. A computing device comprising:
at least one processor; and
non-transitory computer-readable memory storing instructions that, when executed by the at least one processor, are effective to program the at least one processor to:
receive first data representing a first natural language input;
generate second data representing a first semantic interpretation of the first natural language input;
determine a ranked list of intent data processing applications for processing the second data;
select a first intent data processing application from among the ranked list to process the second data;
generate first routing data indicating that a second intent data processing application take a first action prior to processing the second data by the first intent data processing application;
send the first routing data to the second intent data processing application;
receive third data from the second intent data processing application, the third data comprising a result of the second intent data processing application taking the first action; and
send the second data to the first intent data processing application based at least in part on the third data.

14. The computing device of claim 13, the non-transitory computer-readable memory storing further instructions that, when executed by the at least one processor, are further effective to program the at least one processor to:
receive the first routing data from the second intent data processing application; and
determine from the first routing data that the second data be sent to the first intent data processing application.

15. The computing device of claim 13, the non-transitory computer-readable memory storing further instructions that, when executed by the at least one processor, are further effective to program the at least one processor to determine fourth data comprising a policy related to the first intent data processing application, the policy indicating that the second intent data processing application performs the first action prior to sending the second data to the first intent data processing application.

16. The computing device of claim 15, the non-transitory computer-readable memory storing further instructions that, when executed by the at least one processor, are further effective to program the at least one processor to:
determine, from the fourth data, that a third intent data processing application take a second action prior to processing the second data by the first intent data processing application;
determine, from the fourth data, that the first action has priority over the second action; and
after receiving the third data from the second intent data processing application, generating second routing data indicating that the third intent data processing application take the second action.

17. The computing device of claim 13, the non-transitory computer-readable memory storing further instructions that, when executed by the at least one processor, are further effective to program the at least one processor to:
send the second data to the second intent data processing application;

receive the first routing data and the second data from the second intent data processing application; and send the second data, the third data, and the first routing data to the first intent data processing application.

18. The computing device of claim 13, the non-transitory computer-readable memory storing further instructions that, when executed by the at least one processor, are further effective to program the at least one processor to generate, by the first intent data processing application, audio data representing a response to the first natural language input, wherein the audio data is generated based at least in part on the second data and the first routing data.

19. The computing device of claim 13, the non-transitory computer-readable memory storing further instructions that, when executed by the at least one processor, are further effective to program the at least one processor to:

generate, by the second intent data processing application, fourth data representing a request for user authentication information;

receive fifth data comprising the user authentication information from a speech processing-enabled device, wherein the third data comprises an indication that a user has been authenticated; and send the third data to the first intent data processing application.

20. The computing device of claim 13, the non-transitory computer-readable memory storing further instructions that, when executed by the at least one processor, are further effective to program the at least one processor to:

receive, from the second intent data processing application, fourth data comprising a policy indicating that the second intent data processing application performs the first action prior to sending input data corresponding to the first semantic interpretation to the first intent data processing application for processing; and generate the first routing data based at least in part on the fourth data.

* * * * *